United States Patent
Yu et al.

(10) Patent No.: US 8,838,626 B2
(45) Date of Patent: Sep. 16, 2014

(54) EVENT-LEVEL PARALLEL METHODS AND APPARATUS FOR XML PARSING

(75) Inventors: Zhiqiang Yu, Shanghai (CN); Yuejian Fang, Beijing (CN); Lei Zhai, Shanghai (CN); Yun Wang, Shanghai (CN); Zhonghai Wu, Beijing (CN); Mo Dai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 12/641,234

(22) Filed: Dec. 17, 2009

(65) Prior Publication Data
US 2011/0153604 A1  Jun. 23, 2011

(51) Int. Cl.
G06F 17/30 (2006.01)
G06F 17/27 (2006.01)
G06F 17/22 (2006.01)

(52) U.S. Cl.
CPC .......... *G06F 17/2247* (2013.01); *G06F 17/272* (2013.01)
USPC .......... 707/755; 707/602; 715/236; 715/237; 717/143; 717/149

(58) Field of Classification Search
USPC .......... 707/602, 755; 715/236, 237; 717/143, 717/149
See application file for complete search history.

(56) References Cited

U.S. PATENT DOCUMENTS

| | | | |
|---|---|---|---|
| 8,688,435 B2* | 4/2014 | Nasri et al. ........................ | 704/9 |
| 2004/0068487 A1* | 4/2004 | Barton et al. ..................... | 707/3 |
| 2004/0172599 A1* | 9/2004 | Calahan ........................ | 715/513 |
| 2006/0106837 A1* | 5/2006 | Choi .............................. | 707/101 |
| 2006/0136809 A1* | 6/2006 | Fernstrom ..................... | 715/505 |
| 2007/0113171 A1* | 5/2007 | Behrens et al. ............... | 715/513 |
| 2007/0250471 A1* | 10/2007 | Fontoura et al. .................. | 707/2 |
| 2008/0294614 A1* | 11/2008 | Miyashita et al. ............... | 707/4 |
| 2009/0006944 A1* | 1/2009 | Dang et al. ..................... | 715/234 |
| 2009/0089658 A1* | 4/2009 | Chiu et al. ..................... | 715/234 |
| 2009/0125495 A1* | 5/2009 | Zhang et al. ...................... | 707/4 |
| 2011/0072319 A1* | 3/2011 | Agarwal et al. ................. | 714/49 |

OTHER PUBLICATIONS

Lu, Wei, Chiu, Kenneth and Pan, Yinfei,"A Parallel Approach to XML Parsing", http://grid.cs.binghamton.edu/projects/publications/parallel-Grid06/parallel-Grid06.pdf, 2006, pp. 1-8, Bloomington, IN and Binghamton, NY.

(Continued)

*Primary Examiner* — Dennis Truong
(74) *Attorney, Agent, or Firm* — Schwabe, Williamson & Wyatt, P.C.

(57) ABSTRACT

Embodiments of techniques and systems for parallel XML parsing are described. An event-level XML parser may include a lightweight events partitioning stage, parallel events parsing stages, and a post-processing stage. The events partition may pick out event boundaries using single-instruction, multiple-data instructions to find occurrences of the "<" character, marking event boundaries. Subsequent checking may be performed to help identify other event boundaries, as well as non-boundary instances of the "<" character. During events parsing, unresolved items, such as namespace resolution or matching of start and end elements, may be recorded in structure metadata. This structure metadata may be used during the subsequent post-processing to perform a check of the XML data. If the XML data is well-formed, individual sub-event streams formed by the events parsing processes may be assembled into a flat result event stream structure. Other embodiments may be described and claimed.

17 Claims, 7 Drawing Sheets

(56) References Cited

OTHER PUBLICATIONS

Wu, Yu, Zhang, Qi, Yu, Zhiqiang and Li, Jianhu, "A Hybrid Parallel Processing for XML Parsing and Schema Validation", Presented at Balisage: The Markup Conference 2008, Montreal, Canada, Aug. 12-15, 2008. In Proceedings of Balisage: THe Markup Conference 2008. Balisage Series on Markup Technologies, vol. 1 (2008). doi: 10.4242/BalisageVol1.Wu01.

* cited by examiner

EVENT-LEVEL PARALLEL METHODS AND APPARATUS FOR XML PARSING

TECHNICAL FIELD

This application relates to the field of data processing, and in particular, to providing parallel processing of XML data.

BACKGROUND

Computer-based applications and services frequently rely on the receipt and transmission of electronic data to provide services to users. As computing has become increasingly ubiquitous in people's lives, the need for simple and efficient data transfer capabilities has likewise increased. In particular, this has meant an increase in the use of eXtensible Markup Language, or "XML" for short. By supporting self-describing data such as XML, applications are able to communicate more freely with each other and without requiring two applications to have common knowledge of file formats or data structures before communicating.

However, XML data must typically be parsed before the information contained therein is available to an application. An XML document may be complex, containing numerous levels of hierarchically-structured data and data descriptors. If XML parsing is performed in an inefficient matter, bottlenecks can occur, preventing faster operation of the application or service relying on the XML data.

Existing XML parsing techniques have attempted to speed up the parsing process by performing some parsing steps in parallel. However, even where existing systems manage to take advantage of parallel processing, many of these introduce additional complications which hinder the potential improvements of parallel processing. For instance, in some existing parallel XML parsing techniques, parsers which operate on separate pieces of XML data must account for and check dependencies between the pieces. This means that frequent communication must occur between parallel parsing threads, resulting in threads which must pause or slow down while waiting for communication replies. This communication overhead reduces much of the potential speed advantage of parallel XML parsing.

Similarly, existing parallel parsing techniques produce hierarchical output structures, such as those similar to a Document Object Model, or "DOM," structure. In such a structure, structural links are oftentimes required between parent and child nodes. This requires additional communication overhead between parallel parsing threads when their parsed results are to be combined into such a structure. Again, this reduces parsing efficiency.

Finally, in existing parallel XML parsing techniques, XML data is not divided into pieces in an efficient way which also provides for subsequent parsing to be performed quickly and efficiently. Instead, in some techniques XML data is rigorously checked before parallel parsing is to be performed; while this prevents errors in some techniques, it provides yet another bottleneck to efficient processing. In other techniques, while XML data is quickly divided into roughly even chunks for parsing, this partitioning does not perform enough checking, and can result in a parallel parsing process performing unnecessary work, such as separating comment text from traditional data. This requires the parser to operate in a speculative manner and to communicate with other parsing threads, once again introducing unwanted communication overhead.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
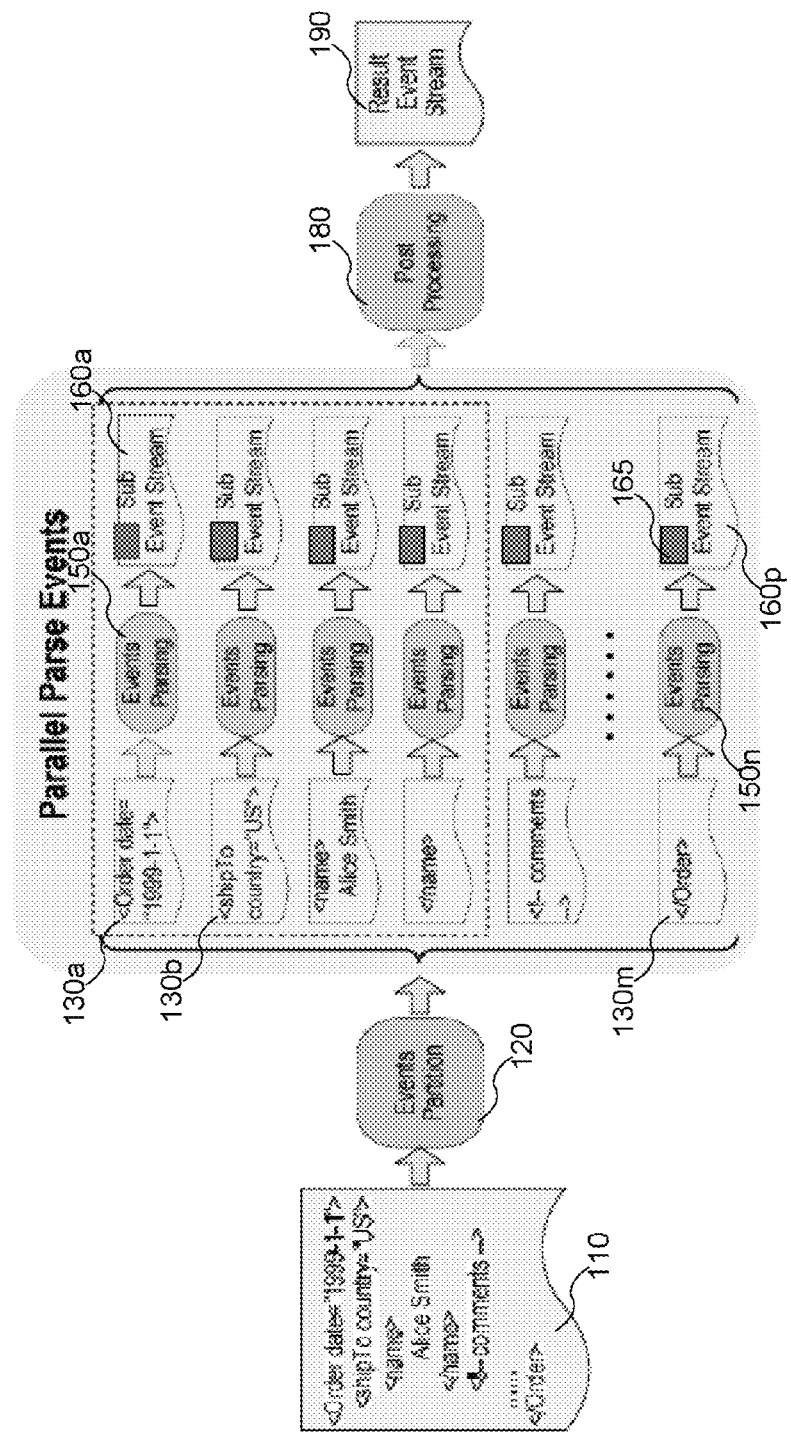
FIG. 1 is a parallel XML parsing system diagram in accordance with various embodiments of the present invention.

Illustrative embodiments of the present invention include, but are not limited to, methods and apparatuses for performing efficient parallel parsing of XML data. The techniques may utilize a lightweight events partitioning process, followed by events parsing processes which may execute in parallel with relatively low communication overhead, followed by a post-processing process that combines the results of the events parsing into a single event stream.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

As mentioned above, embodiments of present techniques include, in a first stage, a lightweight partition that picks out event boundaries by finding each occurrence of a "<" character in XML data. This stage then checks the second character after the "<" to ensure what type of XML event it is looking at, since certain event types, like comments, can contain "<" characters that shouldn't be used for partitioning. This partitioning is called "lightweight" because it largely will only perform two character checks per event, only requiring extra processing for rare special types, such as comments, processing instructions, and unparsed character data, also known as "CDATA". The partitioning is also made more efficient in one embodiment by using single-instruction, multiple-data (SIMD) instructions.

Embodiments of the present techniques and systems may also include a second stage which parses partitioned chunks resulting from the first stage. Chunks may be parsed on separate cores of a computer process comprising a plurality of cores, including multi-core or many-core processors, to provide parallel processing. In one embodiment, the individual parsers may perform traditional XML parsing. However, because the original XML was partitioned, there may likely be unresolved items, such as namespace resolution or matching of start and end elements. Instead of throwing an error as in a traditional parser, the individual event parsers may create a structure metadata to identify unresolved items. In one embodiment, the individual parsers may parse the chunks into individual sub-event streams.

Embodiments of the present techniques and systems may also include a third post-processing stage which may go through each generated sub-event stream and use the created structure metadata to resolve unresolved items. After resolving issues, the post-processing stage may need only to assemble the sub-streams. This results in a single flat event stream data structure. By parsing the XML in these three stages, the present techniques and systems may present several advantages over existing techniques, including potentially a substantial reduction of overhead by 1) performing efficient parsing in the first stage, 2) reducing the need for communication between various parallel-executing event parsers, and/or 3) parsing code in parallel into sub-event streams which may only need to be resolved and assembled at the end.

FIG. 1 illustrates various embodiments of parallel XML parsing techniques of the present disclosure. A piece of XML data, such as the illustrated XML document 110, may be input into an events partition module 120. As discussed above, during the events partition stage, the events partition module 120 may partition the XML data into multiple snippets, or "chunks", which are illustrated herein at chunks 130*a-m*. As will be described the boundaries of chunks 130*a-m* are defined with respect to "<" characters, which typically denote tag boundaries in XML data. In various embodiments, this partitioning may be performed using a lightweight checking, including the use of parallel instructions, such as SIMD instructions, to improve partitioning efficiency. As described earlier, this partitioning is called "lightweight" because it largely will check whether a character in XML data is a "<" character and only perform two character checks per event, only requiring extra processing for rare special types, such as comments, processing instructions, and CDATA. Particular embodiments of this process are described below with reference to process 300 of FIG. 3.

As FIG. 1 illustrates, the partitioned chunks may then be parsed in parallel by events parsing modules 150*a-n* to generate sub-event streams 160*a-p*. In various embodiments, the number of separate events parsing modules may be based, at least in part, on the number of processing cores available on computer processors which are performing the XML parsing techniques. In various embodiments, more than one events parsing module may be executed within a single thread. For instance, in the illustrated FIG. 1, the first four illustrated events parsing modules may all be performed within a single thread (illustrated inside the dotted lines). This may be performed, for example, by combining originally-partitioned events into a larger chunk, which may then be parsed as a whole. Thus, the number of actually-generated events parsing modules may not be equivalent to the number of chunks which were generated during the events partition.

As a result of the events parsing, the events parsing modules 155*a-n* may produce sub-event streams 160*a-p*. In one embodiment, various sub-event streams created may also include structure metadata, such as the illustrated structure metadata 165. As will be described in greater detail below, the structure metadata may support the work of the post-processing stage performed by the post-processing module 180 in checking whether the parsed XML data is well-formed. Thus, in various embodiments, the structure metadata may record information about open elements found during each events parsing stage, such as element names or namespaces. For example, if, as in the example discussed above, the first four illustrated events parsing modules may be performed within a single thread, then both the "shipTo" and "Order" elements may not be closed within the event parsing thread in which they were parsed. The structure metadata for this thread may record that issue for post-processing. However, in various embodiments, the "name" element may not be recorded in the structure metadata, as it is opened and closed within the same chunk.

Finally, the post-processing module 180 may perform a well-formed check on the sub-event streams, resolve open elements using the structure metadata, and produce a result event stream 190. This result event stream may then represent the parsed information contained in the original XML data 110.

Figure 2:
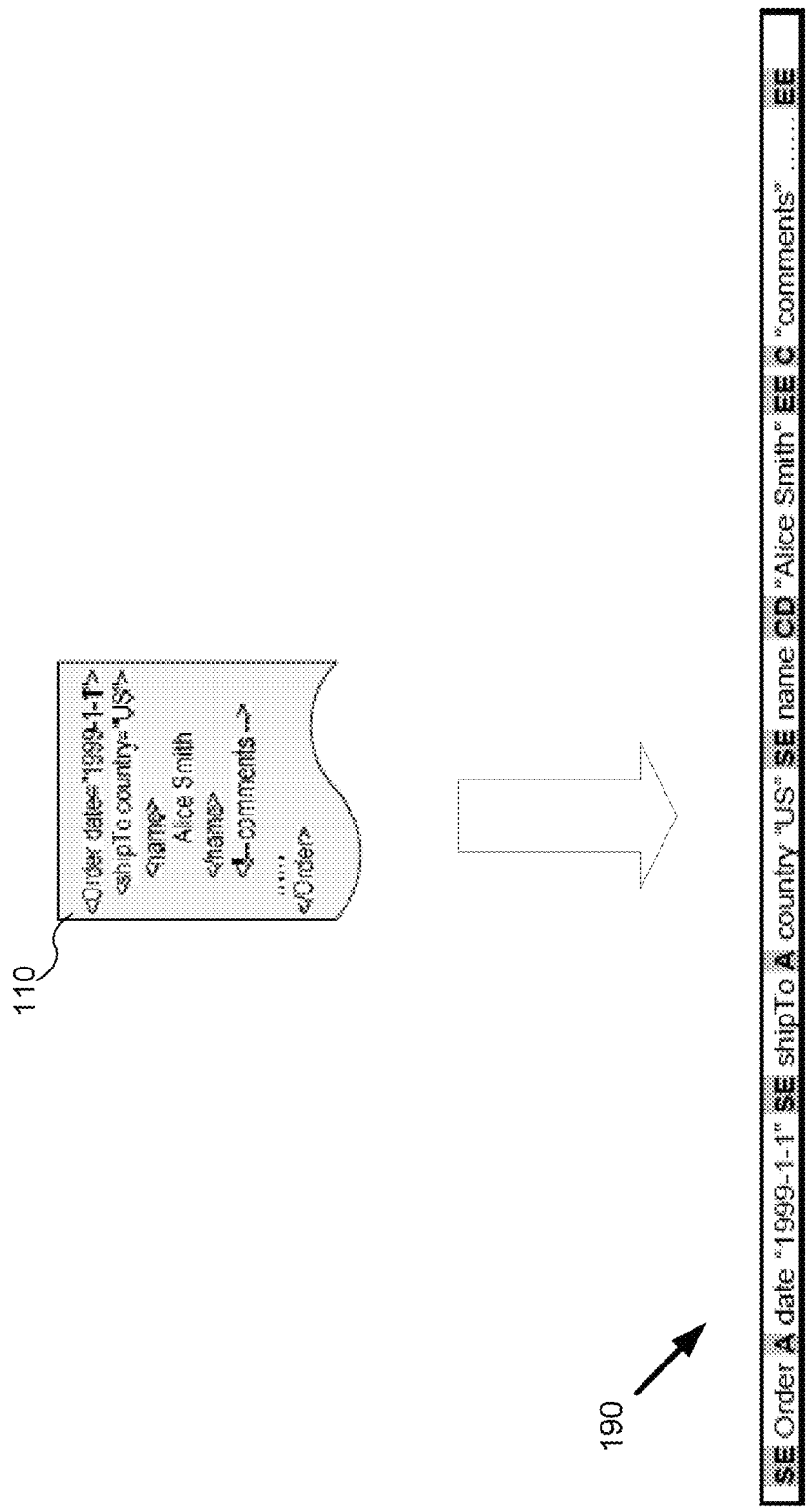
FIG. 2 is a depiction of an event stream resulting from parsing of XML data in accordance with various embodiments.

FIG. 2 illustrates an example result event stream 190 for the XML document 110 illustrated in FIG. 1, in accordance with various embodiments. As illustrated, in various embodiments, an event stream may be an internal representation of parsed XML, similar to SAX (Simple API for XML). In various embodiments, a set of buffers may be employed to contain event data of XML information set, such as elements, attributes, character data, comments, etc. As illustrated, the event stream 190 may begin with a start of element indicator (or "SE") followed by the start element "Order." Next, the event stream 190 may indicate an attribute (marked with "A") followed by the Order attribute data: date "Jan. 1, 1999". Another indicator illustrated in the example event stream may be "CD" for character data; for example "Alice Smith" may be character data included in a "name" element. The event stream may also indicate ends of elements ("EE") as well as Comment data, through the use of the "C" indicator, followed by the comment data itself.

In various embodiments, event stream representation may be used because it is relatively compact and efficient, especially when there are high performance and low memory consumption requirements. This may be contrasted with a DOM-like structure, as described above. While the constituents of event streams may be independent in structure and therefore support independent parallel processing, DOM-like structures may require that individual nodes contain internal cross-references, such as links between siblings, children, and parents. This complexity, unlike the event stream structure which may contain no such cross-references, requires much more communication overhead during parsing. In addition, the use of a DOM-like structure will consume relatively large amounts of memory when generated from a large XML document. This makes handling of large XML documents difficult, a problem which may be lessened by the use of event streams.

Figure 3:
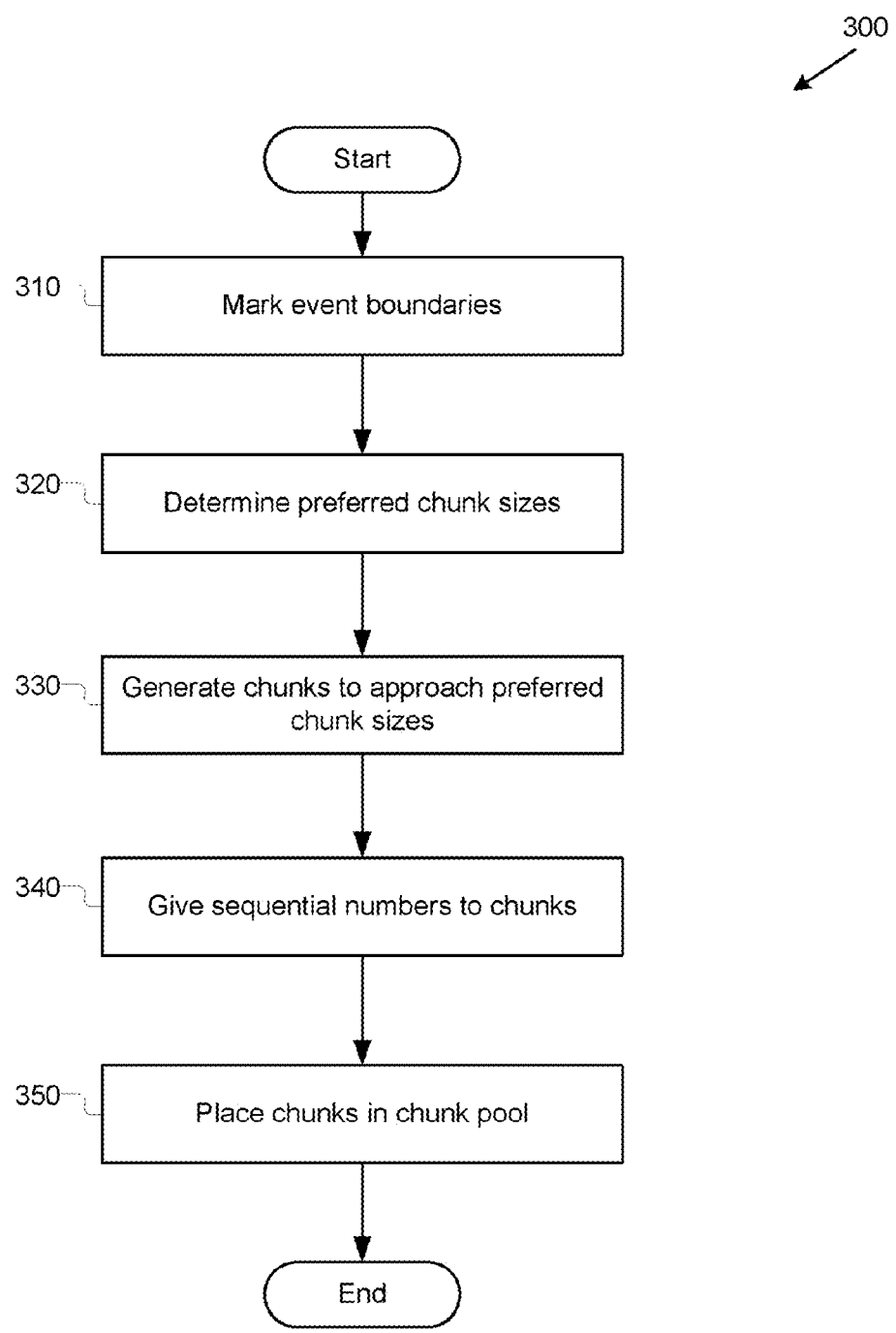
FIG. 3 is a chunk partition process in accordance with various embodiments.

FIG. 3 illustrates a process 300 for an events partitioning module to partition an XML document into chunks for parsing. In various embodiments, processes performed at the blocks illustrated in FIG. 3 may be combined or divided further into sub-processes, and may be re-ordered. The process may begin at block 310, where a lightweight check may be performed to mark event boundaries. Particular methods of performing this check are described below with reference to FIG. 4.

Next at block 320, the events partition module may determine preferred chunk sizes. In various embodiments, these chunk sizes may be determined at run time and may be chosen to increase the efficiency of parallel events parsing. Hence, in various embodiments, chunks may be chosen to be big enough to minimize the number of chunks (and therefore reduce post-processing workload) while also potentially ensuring that each available events parsing processor has at least one chunk to process. In various embodiments, determining chunk sizes may comprise attempting to ensure that for each available processing core, there is at least one chunk available to be processed in an events parsing module on that core. In various embodiments, the events partition module may perform balancing between these needs to generate a minimum partition threshold at this block. In various embodiments this threshold may be based on data size; in another this threshold may be measured by the number of events contained in a chunk.

Next, at block 330, chunks may be created according to the marked event boundaries such that the chunks may come within a pre-determined size variation of a preferred chunk size. In various embodiments, when possible the events partitioning module may place start and end element tags together in one chunk so as to reduce workload during later post processing. Next, at block 340, each created chunk may be given a sequential chunk number. Finally, at block 350, the chunks may be put into a chunk pool from which the chunks may be obtained during events parsing.

Figure 4:
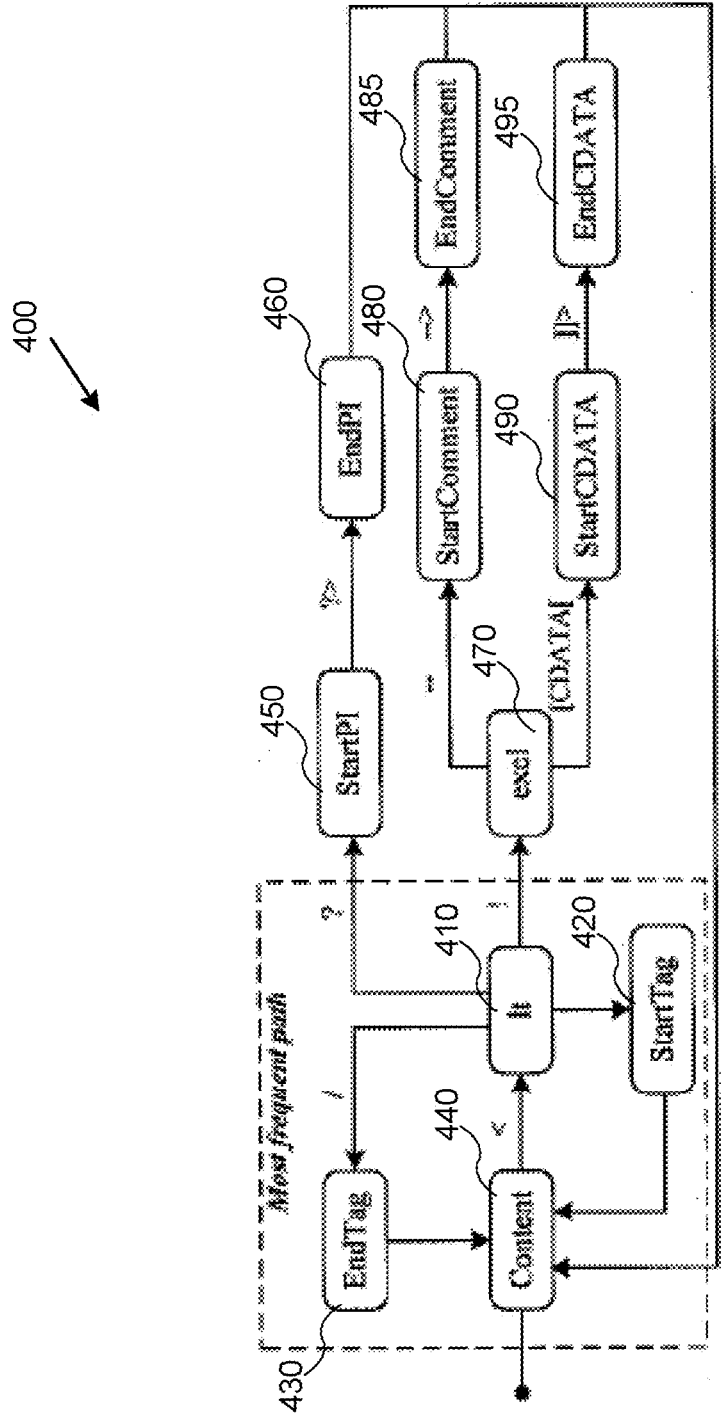
FIG. 4 is an event boundary marking process in accordance with various embodiments.

FIG. 4 illustrates a process 400 for marking boundaries of XML events in an XML document prior to generating chunks to parse. In various embodiments, the process of FIG. 4 may correspond to block 310 of FIG. 3. In various embodiments, processes performed at the blocks illustrated in FIG. 4 may be combined or divided further into sub-processes, and may be re-ordered.

In various embodiments, the process may begin at block 410, where a "<" symbol (also known as the "less than" symbol, and thus represented in FIG. 4 by "lt") may be identified. Because "<" symbols mark the beginning of each XML tag, identifying one of these means that the events partitioning module has identified the start of an event. In various implementations, this identification may be performed using a single instruction, multiple data (or "SIMD") instruction. In one such example, using Streaming SIMD Extensions instructions in platforms such as Intel platforms, one or more positions of a single character, such as "<" can be identified in 128-bit or longer data using a single instruction. This implementation potentially can quickly speed up this initial operation of locating the desired "<" symbol.

Next, the next second character after an indentified "<" character may be checked to determine the type of the XML event which is demarcated by the identified "<" character. Thus, if a "/", a "?", or a "!" character is found, the process may proceed to special treatment of the XML data. The special cases of the "?" and "!" characters will be explained shortly. However, in most cases, the "<" character found at block 410 may either signify a start tag or an end tag. End tags are identified when the "/" character is found in the second position, in which case the process proceeds to block 430, where the end tag is identified. If no special character is found, the process may decide that a start of element tag has been found at block 420. In either event, the process may then continue to block 440, where subsequent characters may be treated as meaningful (but as yet unparsed) content until another "<" character is found, at which point the process may start over again at block 410.

This path, where "<" characters are simply identified and checked for either start or end tags, may be the most frequent path through the process, as denoted by the dotted line in FIG. 4. Because these events are the most common occurrences, the use of SIMD instructions may afford the ability to greatly speed the partitioning process up.

However, some less common cases, such as comments, processing instructions, and CDATA may also be provided for. Thus, occasionally, the check of the second character may identify either a "?", which may indicate at block 450 that processing instructions are following, or "!" which may indicate at block 470 that either CDATA or the start of a comment follows. In all of these cases, it may not be sufficient to simply look for and mark the next "<" character, as the next occurring "<" may be simply character data within one of these special elements, and may not be read as marking an event boundary. For example, a comment element could read:

<!—This element indicates whether age<40.—>

In this case, while the initial "<" character marks the beginning of a comment event, the second "<" character may simply be character data, and may not be considered for the sake of events partitioning. Thus, in each of these cases, the events partitioning module may read further into the XML document to determine when the special case is ended. By performing this checking in these special cases, the events partitioning process may be able to provide data chunks to the events parsing modules which may be known to begin with proper, meaningful "<" characters. This may greatly reduce the complexity of the events parsing modules, and provide for quicker parsing with less communication overhead.

In the case that the second character was a "?", it is known at block 450 that the "<" marked the beginning of processing instructions. In this case, the events partitioning module may continue through the XML data until reaching "?>" at which point the process at block 460 may consider that the instructions have ended. The process may then proceed, just as in the "most frequent path" to treat subsequent characters as content at block 440 until another "<" is reached.

In the case that the second character was a "!" a third check may occur, to determine whether the "<" marked the beginning of a comment (indicated at block 480) or of CDATA (block 490). However, in either event the events partitioning module may continue through the XML data until reaching an indication that the comment has ended (block 485) or that the CDATA has ended (block 495). Then in both cases, just as for the processing instructions, the process may then proceed, to treat subsequent characters as content at block 440 until another "<" is reached.

Figure 5:
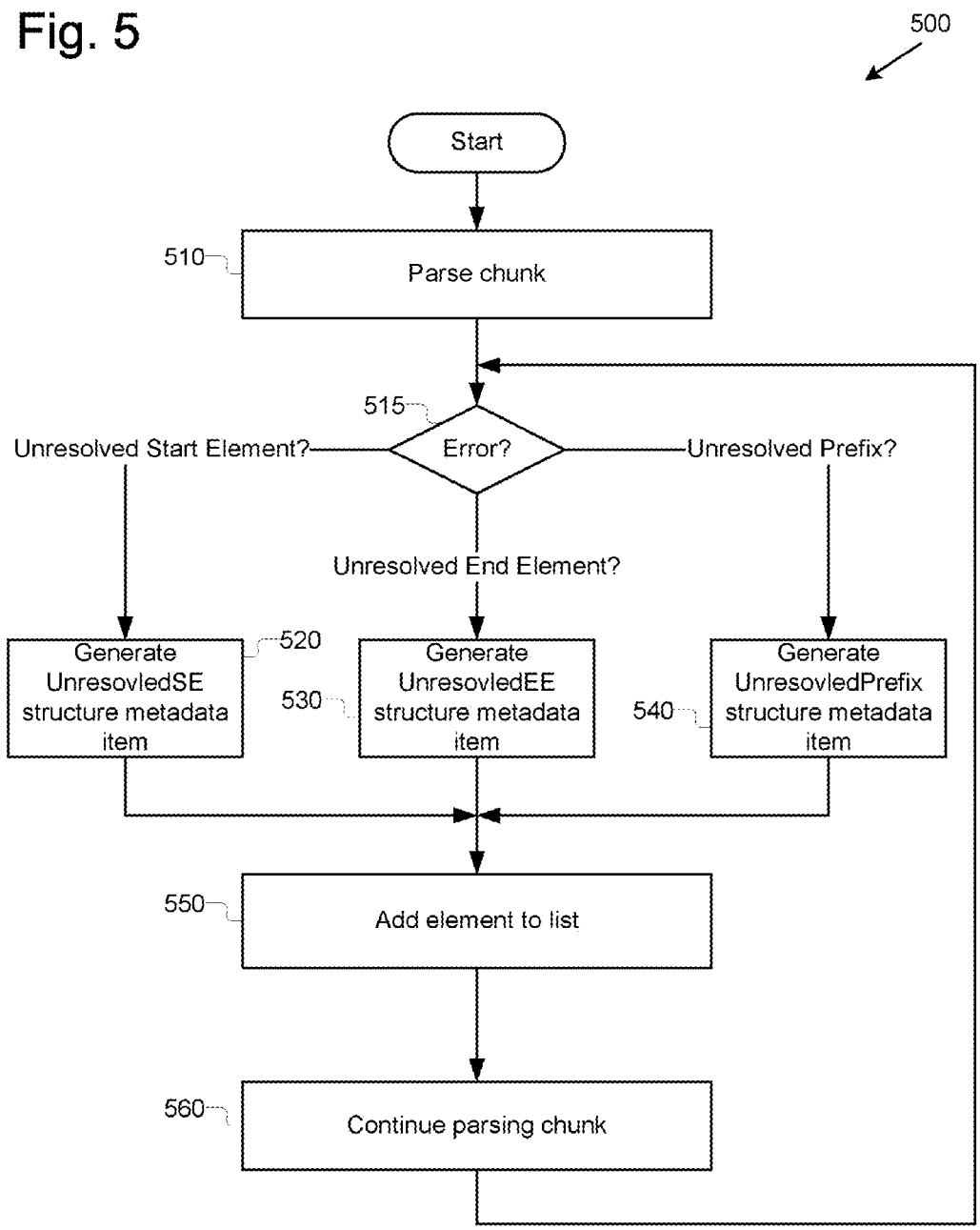
FIG. 5 is a parallel events parsing process in accordance with various embodiments.

FIG. 5 illustrates a process 500 for an events parsing module to parse an identified XML chunk taken from the chunk pool, in accordance with various embodiments. As illustrated, in various embodiments, processes performed at the blocks illustrated in FIG. 5 may be combined or divided further into sub-processes, and may be re-ordered. In various embodiments, the events parsing module may operate on a chunk taken from the chunk pool discussed above with reference to FIG. 3 in the sequential order in which the chunks are added to the pool. In this manner, the resulting sub-event streams, which are also identified in order, may be sequentially combined into the result event stream 190.

The process begins at block 510, where the chunk may be parsed. In various embodiments, the chunk may be parsed into a sub-event stream and the event stream may be given a unique number which maintains the order given to the sequential numbers for the chunks in the chunk pool. In various embodiments, this parsing may be performed largely as a traditional XML parsing, including the parsing of multiple events (if the chunk contains more than one XML event).

However, there is at least one difference between traditional XML parsing and embodiments described herein. Unlike in a traditional parser, when the parsed chunk is found to be incomplete, the chunk (as well as the original XML document) may not be assumed to be in error. Instead, the would-be error may be maintained as information in structure metadata and then used during post-processing to resolve issues.

Thus, at block 515 the process may determine that an error has occurred in the parsed chunk. Next, depending on the type of the error, structure metadata may be created and saved which may record the type of unresolved issue and store information that can be later used to resolve the issue during post-processing. In various embodiments, the structure metadata may be kept as an UnresolvedItemList which comprises one or more UnresolvedItems. An example implementation of this embodiment follows:

| UnresolvedItem | |
| --- | --- |
| Type | enum { UNRESOVED_SE, UNRESOLVED_EE, UNRESOLVED_PREFIX} |
| Item Info | union { UnresolvedSE* , UnresolvedEE*, UnresolvedPrefix* } |
| | UnresolvedSE |
| Name | Unresolved start element name |
| NsList | Namespace definition list in this start element, each ns definition has a unique tag |
| | UnresolvedEE |
| Name | Unresolved end element name |
| | UnresolvedPrefix |
| Prefix | Unresolved prefix name |
| SESPos | Ns tag write back position for the corresponding SES |

For example, when an unresolved start element is found at block 515, the process may conclude that a start element which has been parsed has no corresponding end element in the current chunk. Thus, at block 520, an UnresolvedSE structure metadata item may be generated containing the name of the start element and a namespace definition list and unique tag for this start element. Similarly, when an unresolved end element is found at block 515, meaning an end element has been parsed with no matched start element, then at block 530, an UnresolvedEE structure metadata item may be generated containing the name of the end element. And when an unresolved prefix, meaning a prefix with no associated namespace definition in the current chunk, is found at block 515, then at block 540, an UnresolvedPrefix structure metadata item may be generated with the prefix name as well as a namespace tag write back position for the corresponding sub-event stream. After the structure metadata item is generated, the structure metadata item is then added to the structure metadata list at block 550. The process may then continue parsing the chunk at block 560 unless the chunk has been exhausted, in which case the process ends (not illustrated).

Figure 6:
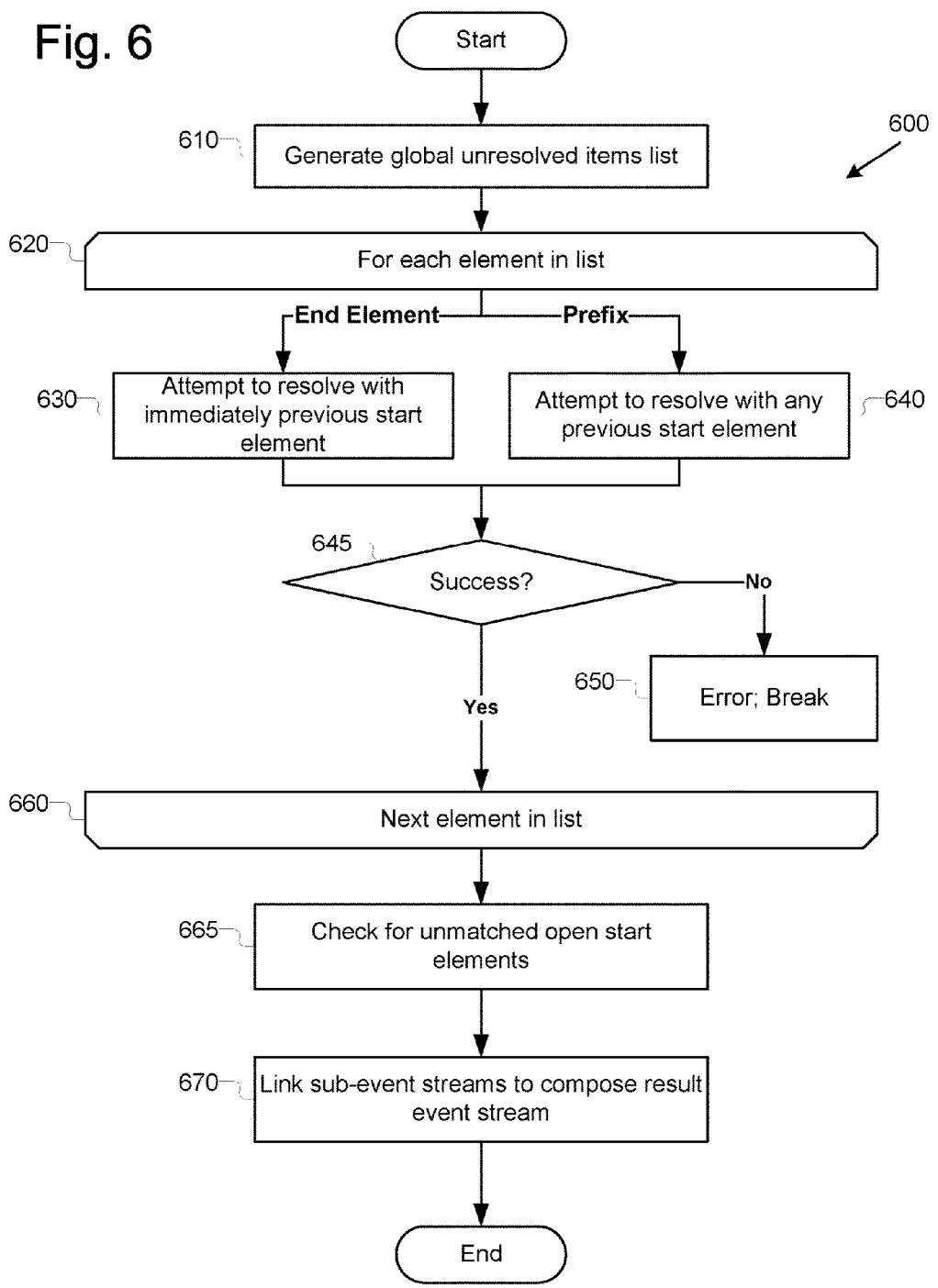
FIG. 6 is a post-processing process in accordance with various embodiments.

FIG. 6 illustrates a process 600 for the post-processing module 180 to check the sub-event streams produced by the events parsing modules against the structure metadata and to produce a result event stream, in accordance with various embodiments. As illustrated, in various embodiments, processes performed at the blocks illustrated in FIG. 6 may be combined or divided further into sub-processes, and may be re-ordered. The process begins at block 610, where the post-processing module generates a global unresolved items list by sequentially linking together each of the lists may be created by the individual events parsing process. Next, at block 620, the module may begin the review of the structure metadata by iterating over each item in the list.

The procedure taken may then depend on the type of unresolved item found. If a start element item is found, the process may take no action and continue the loop (not illustrated). If, however, an unresolved end element is found, then at block 630 the post-processing module may attempt to resolve the element with the item which immediately precedes the element in the list, assuming that item is an unresolved start element. In contrast, if an unresolved prefix is found earlier, the module, at block 640, may attempt to resolve the prefix with its closest preceding start element which has the namespace definition for it in the list. If, at block 645, either of these attempts fails, the module may determine that there is an error in the XML document, and the process may end at block 650. If not, and the resolution was successful, the process may iterate over the next item in the list at block 660.

Next, at block 665, the module may check for unmatched open start elements in the sub-event streams. If any unmatched open start elements exist, then an error may be reported (not illustrated). Finally, when every item in the list has been iterated over and checked, and there are no unmatched start elements, it can be assumed that the parsed sub-event streams were created from well-formed XML data and a result event stream may be made. Thus, at block 670, the various sub-event streams may be linked together by the post-processing module to form a result event stream. In various embodiments, the linking process may be done in sequential order according to the unique numbers given to each sub-event stream. The result event stream may therefore be generated and the process ends. An example implementation of this process in pseudo code follows:

```
Link the UnresolvedItemList in each chunk's SM sequentially to compose
a global g_UnresolvedItemList
UnresolvedItem curItem = g_UnresolvedItemList->first
WHILE c urItem != NULL
    IF curItem->Type = = UNRESOLVED_EE
        Bool match = false
        UnresolvedItem searchItem = curItem->previous
        IF searchItem != NULL && searchItem->Type ==
        UNRESOLVED_SE
            IF searchItem-> ItemInfo->UnresolvedSE ->Name ==
curItem -> ItemInfo->UnresolvedEE ->Name
                match = true
            ENDIF
        END IF
        IF match == true
            UnresolvedItem tempItem = curItem
            curItem = curItem->next
            Remove tempItem and searchItem from the list
        ELSE
            Report start and end element mismatch error and break
        ENDIF
    ELSEIF curItem->Type == UNRESOLVED_PREFIX
        Bool resolve = false
        Int nsTag = 0
        UnresolvedItem searchItem = curItem->previous
        WHILE searchItem != NULL
            IF searchItem->Type == UNRESOLVED_SE
                IF Prefix can be resolved in
searchItem->ItemInfo->UnresolvedSE ->NsList to nsTag
                    resolve = true
                    break
                ENDIF
            ENDIF
```

-continued

```
            searchItem = searchItem->previous
        ENDWHILE
        IF resolve == true
            Write back nsTag to the SES position marked by curItem->
ItemInfo-> UnresolvedPrefix->SESPos
                UnresolvedItem tempItem = curItem
                curItem = curItem->next
                Remove tempItem from the list
        ELSE
            Report prefix unresolved error and break
        ENDIF
    ELSE
        curItem = curItem ->next
    ENDIF
ENDFOR
IF g_UnresolvedItemList->isEmpty
    Link the SES for each chunk to compose a result Event Stream
ENDIF
```

Figure 7:
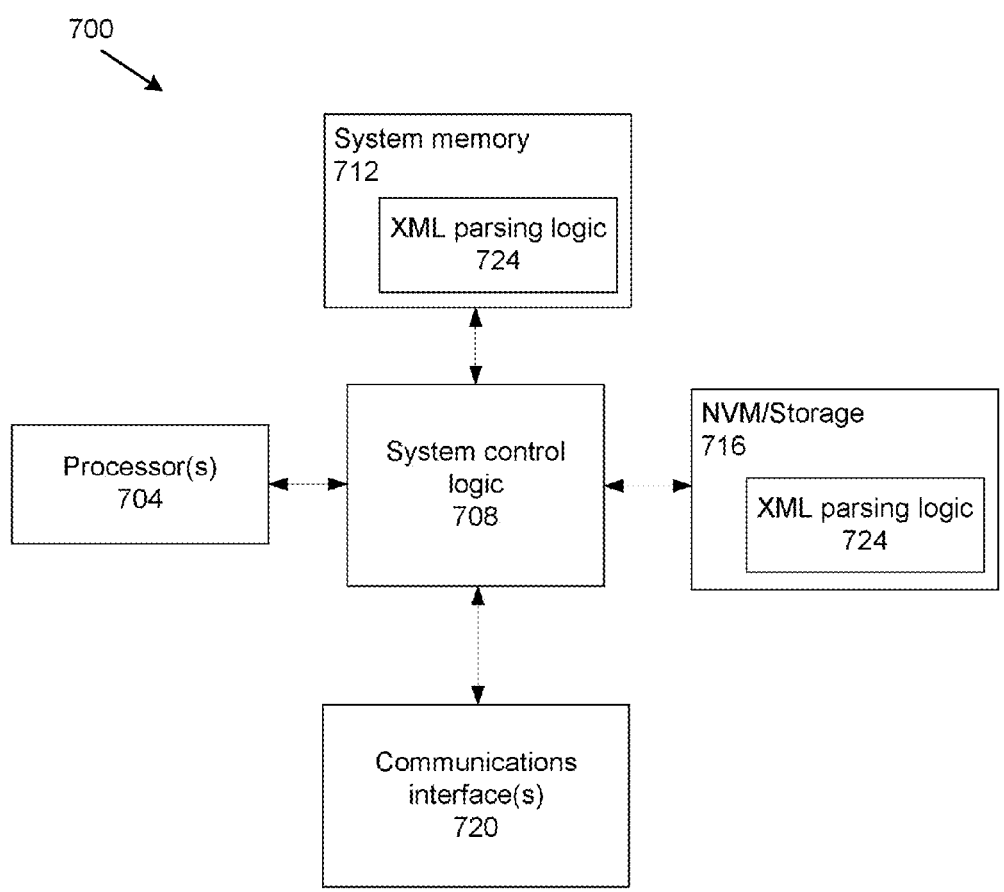
FIG. 7 is a example computing environment in accordance with various embodiments.

The techniques and apparatuses described herein may be implemented into a system using suitable hardware and/or software to configure as desired. FIG. 7 illustrates, for one embodiment, an example system 700 comprising one or more processor(s) 704, system control logic 708 coupled to at least one of the processor(s) 704, system memory 712 coupled to system control logic 708, non-volatile memory (NVM)/storage 716 coupled to system control logic 708, and one or more communications interface(s) 720 coupled to system control logic 708.

System control logic 708 for one embodiment may include any suitable interface controllers to provide for any suitable interface to at least one of the processor(s) 704 and/or to any suitable device or component in communication with system control logic 708.

System control logic 708 for one embodiment may include one or more memory controller(s) to provide an interface to system memory 712. System memory 712 may be used to load and store data and/or instructions, for example, for system 700. System memory 712 for one embodiment may include any suitable volatile memory, such as suitable dynamic random access memory (DRAM), for example.

System control logic 708 for one embodiment may include one or more input/output (I/O) controller(s) to provide an interface to NVM/storage 716 and communications interface (s) 720.

NVM/storage 716 may be used to store data and/or instructions, for example. NVM/storage 716 may include any suitable non-volatile memory, such as flash memory, for example, and/or may include any suitable non-volatile storage device(s), such as one or more hard disk drive(s) (HDD (s)), one or more solid-state drive(s), one or more compact disc (CD) drive(s), and/or one or more digital versatile disc (DVD) drive(s) for example.

The NVM/storage 716 may include a storage resource physically part of a device on which the system 700 is installed or it may be accessible by, but not necessarily a part of, the device. For example, the NVM/storage 716 may be accessed over a network via the communications interface(s) 720.

System memory 712 and NVM/storage 716 may include, in particular, temporal and persistent copies of XML parsing logic 724, respectively. The XML parsing logic 724 may include instructions that when executed by at least one of the processor(s) 704 result in the system 700 performing XML parsing operations as described in conjunction with the either the events partition module, events parsing modules, or post-processing modules described herein. In some embodiments, the XML parsing logic 724 may additionally/alternatively be located in the system control logic 708.

Communications interface(s) 720 may provide an interface for system 700 to communicate over one or more network(s) and/or with any other suitable device. Communications interface(s) 720 may include any suitable hardware and/or firmware. Communications interface(s) 720 for one embodiment may include, for example, a network adapter, a wireless network adapter, a telephone modem, and/or a wireless modem. For wireless communications, communications interface(s) 720 for one embodiment may use one or more antenna(s).

For one embodiment, at least one of the processor(s) 704 may be packaged together with logic for one or more controller(s) of system control logic 708. For one embodiment, at least one of the processor(s) 704 may be packaged together with logic for one or more controllers of system control logic 708 to form a System in Package (SiP). For one embodiment, at least one of the processor(s) 704 may be integrated on the same die with logic for one or more controller(s) of system control logic 708. For one embodiment, at least one of the processor(s) 704 may be integrated on the same die with logic for one or more controller(s) of system control logic 708 to form a System on Chip (SoC).

In various embodiments, system 700 may have more or less components, and/or different architectures.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A computer-implemented method for parsing XML data, the method comprising:
    partitioning, by an events partitioning module of a computing device, the XML data into a plurality of XML chunks having a plurality of XML events contained therein, wherein partitioning includes determining a type of event associated with individual XML events of the plurality of XML events and ignoring character data contained within one or more XML events based, at least in part, on the type of event to prevent identification of character data contained within the one or more XML events from being identified as an XML event;
    parsing, by a plurality of instances of an events parsing module of the computing device, the plurality of chunks in parallel into sub-event streams, wherein parsing includes creating structure metadata to identify unresolved items in the sub-event streams to avoid a parsing error based on the unresolved items, wherein the unresolved items include one or more of an identity of an unresolved start element, an identity of an unresolved end element, or an identity of an unresolved prefix; and generating, by a post processing module of the computing device, a result event stream for the XML data from the sub-event streams, wherein generating the result event stream includes resolving an unresolved end element identified in the structure metadata with a preceding unresolved start element identified in the structure metadata or resolving an unresolved prefix identified in the structure metadata with a namespace of a preceding start element to avert the need to reparse the XML chunks that produced the unresolved item.

2. The method of claim 1, wherein generating the result event stream further includes:

post-processing the sub-event streams sequentially; and producing the result event stream by recombining the plurality of XML chunks and linking the post-processed sub-event streams together.

3. The method of claim 2, wherein partitioning the XML data into a plurality of XML chunks is based on a threshold indicated by a number of XML events to include in each XML chunk of the plurality of XML chunks.

4. The method of claim 2, wherein partitioning the XML data into a plurality of XML chunks is based on a pre-determined size variation of a threshold indicated by a preferred chunk size.

5. The method of claim 2, wherein partitioning the XML data into a plurality of XML chunks comprises at least one XML chunk that contains a matching start element and end element.

6. The method of claim 2, wherein partitioning comprises partitioning at least partially in parallel using single instruction, multiple data (SIMD) instructions.

7. The method of claim 1, wherein parsing the plurality of chunks in parallel comprises parsing XML chunks on respective ones of a plurality of cores on a multi-core or many-core processor.

8. The method of claim 1, wherein partitioning includes:

identifying XML event boundaries by locating "<" characters in the XML data, wherein determining a type of event associated with individual XML events of the plurality of XML events is based on a character following the "<" character; and forming the plurality of XML chunks from the identified XML events.

9. The method of claim 1, wherein parsing comprises parsing the plurality of chunks in parallel into sub-event streams devoid of internal cross-references or generating comprises generating a result event stream devoid of internal cross-references.

10. A system comprising:

storage memory configured to store an XML document;

one or more processors having a plurality of processor cores, coupled to the storage memory;

an events partitioning module which, upon execution by the processor, causes the processor to partition the XML document into a plurality of XML chunks having a plurality of XML events contained therein, wherein partition includes determination of a type of event associated with individual XML events of the plurality of XML events and exclusion of character data contained within one or more XML events based, at least in part, on the type of event to prevent identification of character data contained within the one or more XML events from being identified as an XML event;

a plurality of instances of an events parsing module which, upon execution by one or more of the plurality of processor cores, cause the one or more of the plurality of processor cores to perform, in parallel, events parsing of the plurality of XML chunks to produce respective sub-event streams and structure metadata, the structure metadata identifying unresolved items in the sub-event streams to avoid a parsing error based on the unresolved items, wherein the unresolved items include one or more of an identity of an unresolved start element, an identity of an unresolved end element, or an identity of an unresolved prefix; and a post-processing module which, when executed by at least one processor of the one or more processors, causes the at least one processor to perform post-processing on the sub-event streams to produce a result event stream, wherein to produce the result event stream includes resolution of an unresolved end element identified in the structure metadata with a preceding unresolved start element identified in the structure metadata or resolution of an unresolved prefix identified in the structure metadata with a namespace of a preceding start element to avert the need to reparse the XML chunks that produced the unresolved item.

11. The system of claim 10, wherein the post-processing module, when executed by the at least one processor, causes the processor to:

process the sub-event streams sequentially; and produce the result event stream through recombination of the plurality of XML chunks and linking of the processed sub-event streams.

12. The system of claim 11, wherein to partition the XML document includes:

identification of XML events by locating "<" characters in the XML document wherein determination of a type of event associated with individual XML events of the plurality of XML events is based at least in part on a character following the "<" character;

and formation of the plurality of XML chunks from the identified XML events.

13. One or more non-transitory computer-readable storage media containing instructions which, upon execution by a processor having a plurality of cores, cause the processor to:

partition an XML document into a plurality of XML chunks containing a plurality of XML events, wherein partition includes determination of a type of event associated with individual XML events of the plurality of XML events and exclusion of character data contained within one or more XML events based, at least in part, on the type of event to prevent identification of character data contained within the one or more XML events from being identified as an XML event;

perform, in parallel on respective cores of the processor, events parsing of XML chunks to produce respective sub-event streams and structure metadata to identify unresolved items in the sub-event streams and avoid a parsing error based on the unresolved items, wherein the unresolved items include one or more of an identity of an unresolved start element, an identity of an unresolved end element, or an identity of an unresolved prefix; and perform post-processing on the sub-event streams to produce a result event stream, wherein to produce the result event stream includes resolution of an unresolved end element identified in the structure metadata with a preceding unresolved start element identified in the structure metadata or resolving an unresolved prefix identified in the structure metadata with a namespace of a preceding start element to avert the need to reparse the XML chunks that produced the unresolved item.

14. The non-transitory computer-readable media of claim 13, wherein perform post-processing includes:
process the sub-event streams sequentially; and
produce the result event stream through recombination of the plurality of XML chunks and linking together of the post-processed sub-event streams.

15. The non-transitory computer-readable media of claim 13, wherein partition includes:
identification of XML events through location of "<" characters in the XML document, wherein determination of a type of event associated with individual XML events of the plurality of XML events is based at least in part on a character following the "<" character; and
formation of the plurality of XML chunks from the identified XML events.

16. The system of claim 10, wherein to partition is performed at least partially in parallel through use of single instruction, multiple data (SIMD) instructions.

17. The non-transitory computer-readable media of claim 13, wherein to partition is performed at least partially in parallel through use of single instruction, multiple data (SIMD) instructions.

* * * * *